UNITED STATES PATENT OFFICE.

FRITZ RASCHIG, OF LUDWIGSHAFEN-ON-THE-RHINE, GERMANY.

ELASTIC ARTIFICIAL CORK AND PROCESS OF PRODUCING SAME.

1,170,102.     Specification of Letters Patent.    Patented Feb. 1, 1916.

No Drawing.    Application filed April 10, 1915. Serial No. 20,558.

*To all whom it may concern:*

Be it known that I, Dr. FRITZ RASCHIG, doctor of philosophy, chemist, a citizen of the German Empire, residing at Ludwigshafen-on-the-Rhine, Germany, have invented new and useful Improvements in Elastic Artificial Cork and Processes of Producing Same, of which the following is a specification.

This invention relates to the manufacture of artificial cork which is characterized by its elasticity and its low specific weight, and to the products resulting from such manufacture; and it comprises, as a process, the heating of suitable cork particles together with a binder under a high vacuum, whereby the air in the cork particles is expelled and a less porous and more uniform product obtained; more specifically it comprises such a process carried out with molded blocks or articles of the mixture of cork particles with the binder, and particularly with a heat-coagulable binder such as albumen or casein or solutions or salts either with or without formaldehyde or other hardening agents, and during which process the heat is gradually raised to e. g. 70 to 80° C. for the coagulation and hardening, such hardening taking place at a relatively low temperature under the high vacuum and giving a lighter colored and more uniform and valuable product of particularly low specific weight; and as a product it comprises such a light colored, homogeneous, and elastic artificial cork of particularly low specific weight, said product having, for example, a specific gravity of about .220; by "about .220" is meant a density materially less than the density (.240) of the average natural cork; more specifically it comprises such an artificial cork having a coagulated or hardened protein as binder, the hardening of which has been effected at relatively low temperatures and under a high vacuum, whereby the product is rendered substantially free from occluded air and porosity and possesses valuable elastic properties, while nevertheless being insoluble; all as more fully hereinafter set forth and as claimed.

It has heretofore been proposed to produce artificial cork from ground cork waste by mixing with suitable binders such as albumen and casein, together with other substances such as glycerin, and subsequently hardening. In these processes the glycerin helps to give the final cork products the necessary softness and elasticity. In such processes the hardening has usually been carried out at around the boiling point of water (100° C. or 212° F.), by means of steam heat. The products resulting from such processes, however, are often too hard, or become hard on standing, so that they are in many cases less valuable than natural cork. Moreover, such products as heretofore produced are of a relatively heavy and dense structure, having a specific gravity of about .260.

It is one of the objects of the present invention to produce an artificial cork which is free from such objections as those mentioned, and which in addition has important distinguishing characteristics of its own, such as a color similar to that of natural cork, a uniformity of texture and composition, a substantial freedom from occluded air, and a particularly low specific gravity, *e. g.* .220.

In producing the new product of the present invention the cork waste is ground and purified to the desired extent, and bleached, or otherwise preliminarily treated in any desired or suitable manner. The cork particles may advantageously be of a granular nature and of approximately uniform size. With the cork waste is mixed a suitable heat-coagulable or hardened binder, such as casein or casein salts, albumen, solutions of albumen or casein in suitable solvents, either with or without the further addition of glycerin and other compounds. Suitable albumen or protein solutions combined or subsequently treated with formaldehyde, etc., such as have heretofore been used are available for the purposes of the present invention. The binder should, however, advantageously have such a consistency or concentration, and be used in such amount, that the individual particles of the waste are uniformly covered or coated. After suitable mixing and coating of the cork waste with the binder, the mass is molded in sheets or blocks under a suitable pressure sufficient to form a coherent homogeneous mass. The blocks are then exposed to a high vacuum in vessels made of cast iron or other suitable material. These vessels may be heated by steam or exhaust steam from any suitable source. The vacuum can be obtained by any suitable means, and may advantageously be as high as is readily available. As is well known, cork is of a peculiar porous cellular structure and the pores vary in size and nature. Such lack of homogeneity is to be expected in such natural woods and barks which require many years for their growth. During the mixing and coating of the cork particles with the binder more or less air is necessarily occluded within the cork particles. The action of the vacuum upon the cork particles and the air contained therein is to expand and withdraw or tend to withdraw this air. The expansion of the air before its escape tends to expand the cork particles, this expansion acting against the pressure of the mold so that the particles are firmly pressed against and bound to each other while the cork particles themselves are expanded. Moreover, the withdrawal of the occluded or interior air makes it possible for the binder to penetrate into the interior of the cork particles farther than it could otherwise since it is not prevented by the compressed occluded air. It may be mentioned that when mixtures of cork waste and binder have been compressed heretofore to a small fraction, (e.g. 1/6) their original bulk, the air in the cork particles has been correspondingly compressed to a pressure many times atmospheric.

The difference between cork particles containing air compressed to e.g. six atmospheres pressure, and with its pressure further increased by heating and resulting tendency toward expansion, and cork particles from which the air is largely removed by suction, and from which the removal is assisted by the tendency of the air to expand on heating, will be clear without further elucidation. The same is in part true with steam set free in the mold. Since, even with a porous mold, the effect of the pressure is to counteract the tendency of the steam to form and escape and thus hold it within the mass, while by the use of a high vacuum the escape of such steam as well as air is promoted rather than prevented. As a result the cork particles are much more uniformly and homogeneously coated and bound together, the binder being in part interiorly combined, to the extent that the binder is forced into the cells or openings from which the air has been removed and from which the air, unless removed, would tend to prevent the entrance of the binder. The cork particles are consequently bound together more uniformly and are moreover more uniformly arranged to give a homogeneous product. The heating of the blocks or articles is effected by a gradually increasing temperature while subjected to the vacuum. It is advantageous to carry out the heating so that a maximum temperature of 70 to 80° C. is reached in about five or six days. Under these conditions a very gradual drying of the mass takes place, with a similar gradual hardening of the binder. Not only does the use of a vacuum result in a more homogeneous and uniform product, but it enables the hardening and drying to be effected at a materially reduced temperature. As a result the product at the end of the process possesses properties similar to those of natural cork, being of the same light color, and having similar elastic properties. It can be readily cut into stoppers, rings, packings, etc., the same as the natural cork.

When the cork compositions are heated to 100° C. or 212° F. according to the known processes, and particularly where temperatures as high as 110° are used, not only does the binder become hard and brittle, but the cork itself loses much of its natural elasticity and becomes brittle, while its color and that of the resulting product tend to become darker. As distinguished from such processes and products the product of the present invention is light in color and elastic, and similar in appearance and properties to the natural cork itself. The use of the lower temperature avoids the objectionable hardening, darkening and decomposition which takes place at higher temperatures. The difference between the product of the present invention and that of known processes is particularly marked in their specific gravities. Thus while the artificial cork compositions heretofore known have a specific gravity of about .260, that of the present invention is about .220, the product being nevertheless homogeneous and uniform in structure. The removal of the occluded air from the cork particles, or of most of this air, by the vacuum, with accompanying expansion or tendency toward expansion of the cork particles in the binder and the resulting forcing of the particles into most intimate cohesive relation and of the binder into the particles, makes possible the molding of the articles and their hardening under a less pressure than otherwise possible for a compact and homogeneous product.

In referring to the binder as heat-coagulable or heat-hardened, it is intended to refer to such binders as casein or protein and its salts, solutions and compounds, and to similar binders which are acted upon by the heating under pressure to form an elastic and insoluble binder for the artificial cork product. For promoting or modifying the action of the binder other ingredients can be added such as glycerin or carbohydrates for softening or modifying the material and particularly such as formaldehyde and similar hardening agents for promoting the coagulation or hardening.

I claim:

1. As a new article of manufacture an artificial cork comprising cork particles and a heat-hardened binder and characterized by the properties of a product hardened by heating under pressure and under a high vacuum, said product being elastic and of low specific weight.

2. As a new article of manufacture an artificial cork comprising cork particles bound together into a homogeneous body by a heat-hardened protein binder, and the particles of said cork being substantially free from occluded air.

3. As a new article of manufacture an artificial cork comprising cork particles bound together by a heat-hardened protein binder hardened under a high vacuum.

4. As a new article of manufacture an artificial cork comprising cork particles bound together by a heat-hardened protein binder hardened under a vacuum at a temperature not exceeding about 70 to 80° C., said product being of a light color and low specific gravity.

5. As a new article of manufacture an artificial cork comprising cork particles bound together by a heat-hardened protein binder and having a specific gravity of about .220.

6. The process of producing an artificial cork which comprises hardening a mixture of cork particles and a heat-coagulable binder by heating under pressure in a vacuum.

7. The process of producing an artificial cork which comprises hardening a mixture of cork particles and heat-coagulable binder by heating in a vacuum under pressure to a temperature not exceeding about 70 to 80° C.

8. The process of producing an artificial cork which comprises hardening a mixture of cork particles and a heat-coagulable protein binder by heating under pressure in a vacuum.

9. The process of producing an artificial cork which comprises hardening a mixture of cork particles and a heat-coagulable protein binder by heating in a vacuum under pressure to a temperature not exceeding about 70 to 80° C.

10. The process of producing an artificial cork which comprises hardening a mixture of cork particles and a heat-coagulable protein binder by heating gradually under pressure and under a vacuum to a temperature of about 70 to 80° C.

11. The process of producing an artificial cork which comprises coating cork particles with a solution of a proteid binder coagulable by heating, and hardening the resulting coated particles by heating under pressure and in a high vacuum.

12. The process of producing an artificial cork which comprises coating cork particles with a solution of a proteid binder coagulable by heating, and hardening the resulting coated particles by heating gradually for a period of about five or six days under a high vacuum to a temperature of about 70 to 80° C.

In testimony whereof, I have hereunto set my hand in the presence of two subscribing witnesses.

Dr. FRITZ RASCHIG.

Witnesses:
 JOHANNAS DEUSCHEL,
 C. INNESS BROWN.